E. BELL.
TROLLEY SWITCH PLATE.
APPLICATION FILED DEC. 26, 1908.
928,839.
Patented July 20, 1909.
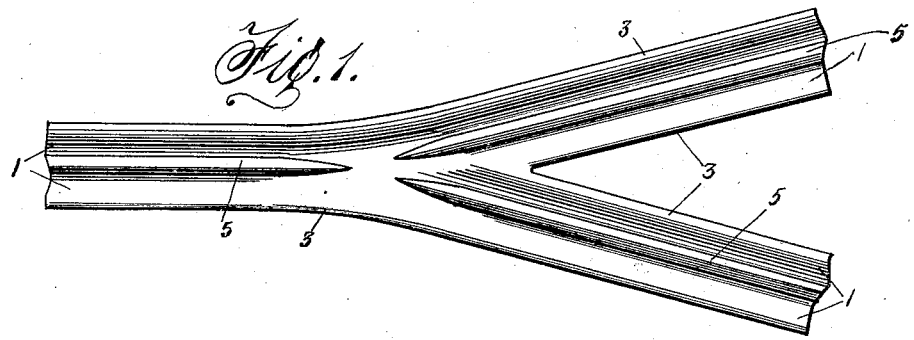
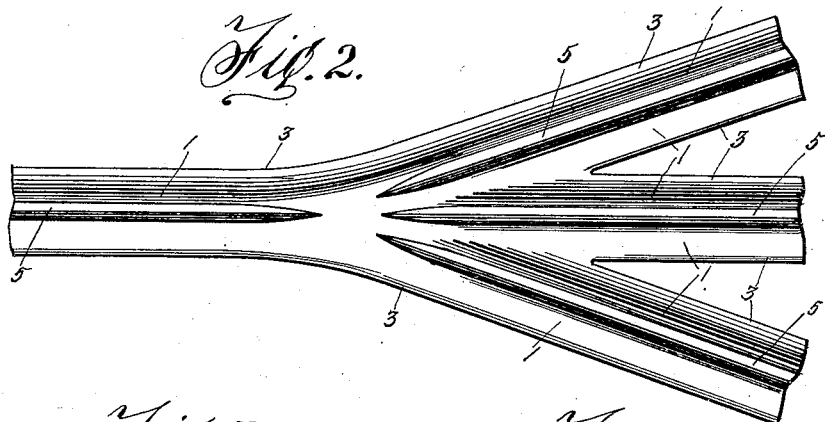
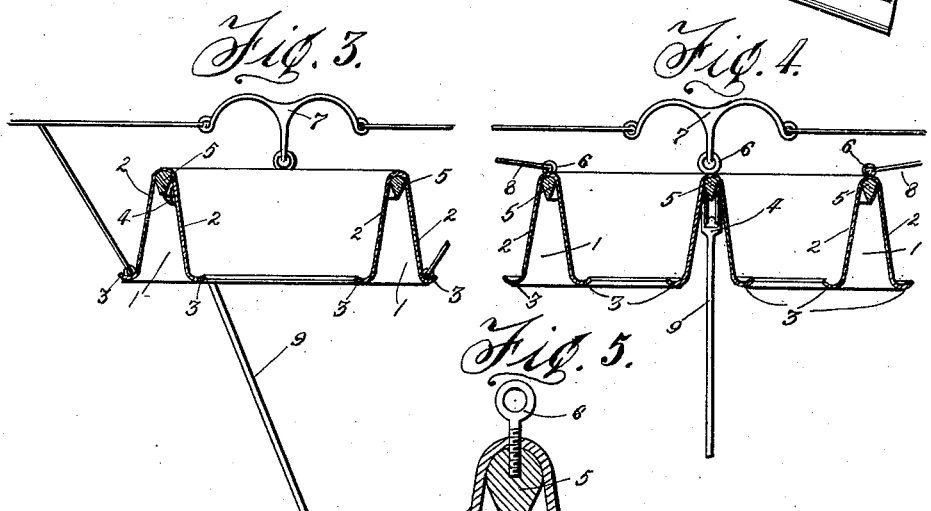
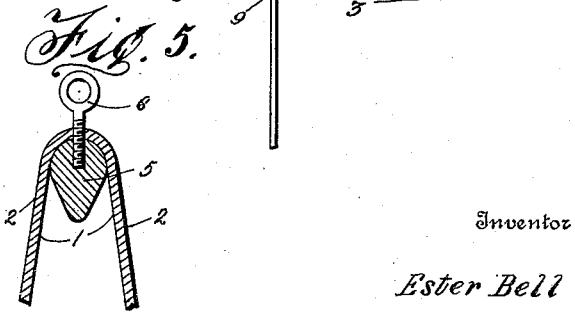
Inventor
Ester Bell
Witnesses
R. L. Farrington.
R. H. Butler
By H. C. Evert & Co.
Attorneys

UNITED STATES PATENT OFFICE.

ESTER BELL, OF DUNBAR, PENNSYLVANIA.

TROLLEY SWITCH-PLATE.

No. 928,839.     Specification of Letters Patent.     Patented July 20, 1909.

Application filed December 26, 1908. Serial No. 469,296.

*To all whom it may concern:*

Be it known that I, ESTER BELL, a citizen of the United States of America, residing at Dunbar, in the county of Fayette and State of Pennsylvania, have invented certain new and useful Improvements in Trolley Switch-Plates, of which the following is a specification, reference being had therein to the accompanying drawing.
This invention relates to a trolley switch plate, and the object of my invention is to provide a switch plate having depending inverted V-shaped guide flanges for preventing a trolley wheel from jumping from the electrical conductor in the switch plate and injuring the switch plate, the hanger thereof, and the over-head work of a street railway system.

The detail construction entering into my invention will hereinafter appear and then be particularly pointed out in the appended claims.

In the drawings, Figure 1 is a bottom plan of a two-way switch plate, Fig. 2 is a similar view of a three-way switch plate, Fig. 3 is a cross sectional view of the two-way switch plate, Fig. 4 is a cross sectional view of a three-way switch plate, and Fig. 5 is an enlarged cross sectional view of a portion of one of said plates.

In the practice of my invention, I preferably use sheet metal that can be easily pressed and shaped to provide a trolley switch plate having converging guide grooves formed therein for safely guiding a trolley wheel from one wire or electrical conductor to another.

The metal is shaped and bent to provide inverted V-shaped grooves 1, having side walls 2, the lower edges of said side walls being flared outwardly, as at 3 to permit of a trolley harp 4 being easily guided into the groove 1. In the apex of the groove 1 is secured a V-shaped guide rail and electrical conductor 5, between the side walls 2 or secured in position by eyebolts 6, these bolts permitting of a hanger 7 and suspension wires 8 being connected to the switch plate to support the same above a track or tracks.

In a two-way switch plate, two of the grooves 1 converge into a single groove, and in a three-way switch plate three of said grooves converge into one groove, representing three tracks converging into one.

The side walls 2 safely guide the trolley harp 4 and the trolley pole 9 when passing beneath a switch plate and considerable time and labor is saved by making it unnecessary for the conductor or operator of the car to give a trolley pole his attention when passing intersections.

While in the drawings there is illustrated the preferred embodiment of my invention, I would have it understood that the elements thereof can be varied as to shape, and size without departing from the spirit of the invention.

Having now described my invention, what I claim as new, is;—

1. A trolley switch plate provided with inverted V-shaped converging grooves, and V-shaped electrical conductors located in the apex of said grooves, substantially as described.

2. A trolley switch plate comprising side walls, providing inverted V-shaped grooves, and electrical conductors located in said grooves, substantially as described.

3. A trolley switch plate comprising converging guide-ways of inverted V-shape in cross section, said guide-ways flaring at their lower ends, and electrical conductors located in said guide-ways.

In testimony whereof I affix my signature in the presence of two witnesses.

ESTER BELL.

Witnesses:
     JAMES BARRETT,
     JOSEPH CEPLECHE.